US006735454B1

(12) United States Patent
Yu et al.

(10) Patent No.: US 6,735,454 B1
(45) Date of Patent: May 11, 2004

(54) METHOD AND APPARATUS FOR ACTIVATING A HIGH FREQUENCY CLOCK FOLLOWING A SLEEP MODE WITHIN A MOBILE STATION OPERATING IN A SLOTTED PAGING MODE

(75) Inventors: Nicholas K. Yu, San Diego, CA (US); Kenneth David Easton, San Diego, CA (US); Raghu Sankuratri, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/434,869

(22) Filed: Nov. 4, 1999

(51) Int. Cl.⁷ .................................. H04B 1/16
(52) U.S. Cl. ....................... 455/574; 455/343
(58) Field of Search ................. 455/502, 503, 455/67.1, 67.6, 573, 574, 343; 370/310

(56) References Cited

U.S. PATENT DOCUMENTS 5,953,648 A * 9/1999 Hutchison, IV et al. .... 455/343
6,212,398 B1 * 4/2001 Roberts et al. ............. 455/343

FOREIGN PATENT DOCUMENTS

| EP | 0818910 | 1/1998 |
|----|---------|--------|
| EP | 0851593 | 7/1998 |
| EP | 0924947 | 6/1999 |
| GB | 2320398 | 6/1998 |
| GB | 2324681 | 10/1998 |
| WO | 9858460 | 12/1998 |
| WO | 0010354 | 2/2000 |

* cited by examiner

Primary Examiner—Charles Appiah
(74) Attorney, Agent, or Firm—Philip R. Wadsworth; Charles D. Brown; Howard H. Seo

(57) ABSTRACT

A technique for activating an active-mode high frequency clock following a sleep period for use within a mobile station wherein selected components of the mobile station operate using a low power, low frequency sleep-mode clock during the sleep period and the faster high frequency active-mode clock during non-sleep periods. In one embodiment, the technique is implemented by a device having a wake-up estimation unit for estimating a wake up time using the sleep-mode clock and a frequency drift compensation unit for compensating for any error in the estimated wake up time caused by frequency drift in the sleep-mode clock. An off-set time compensation unit is also provided for compensating for a lack of precision in the low frequency sleep-mode clock resulting in a possible error in the estimated wake up time. The lack of precision can result in an initial timing off-set error at the beginning of the sleep period and an final timing off-set error at the end of the sleep period. Both the frequency drift compensation unit and the off-set time compensation unit employ a high frequency transition-mode clock signal for use in calculating the time required to adjust the wake-up time. The transition-mode clock, which may have the same frequency as the active-mode clock, is employed only at the beginning and end of the sleep period and is deactivated throughout most of the sleep period to reduce power consumption.

20 Claims, 5 Drawing Sheets

METHOD AND APPARATUS FOR ACTIVATING A HIGH FREQUENCY CLOCK FOLLOWING A SLEEP MODE WITHIN A MOBILE STATION OPERATING IN A SLOTTED PAGING MODE

BACKGROUND OF THE INVENTION

I. Field of the Invention

The invention generally relates to mobile communication systems and in particular to techniques for activating a high frequency clock following a sleep period within a mobile station of a mobile communications system employing slotted paging.

II. Description of the Related Art

Certain state of the art wireless communication systems, such as Code Division Multiple Access (CDMA) Systems, employ slotted paging to allow mobile stations to conserve battery power. In a slotted paging mode, paging signals are transmitted from a base station to particular mobile stations only within assigned paging slots separated by predetermined intervals of time. Accordingly, each individual mobile station may remain within a sleep mode during the period of time between consecutive paging slots without risk of missed paging signals. Whether any particular mobile station can switch from an active-mode to a sleep mode depends, however, upon whether the mobile station is currently engaged in any user activity such as processing input commands entered by the user or processing a telephonic communication on behalf of the user. Assuming that the mobile station is not currently engaged in any processing on behalf of the user, the mobile station automatically powers down selected internal compounds during each period of time between consecutive slots. One example of a slotted paging system is disclosed in U.S. Pat. No. 5,392,287, entitled "Apparatus and Method for Reducing Power Consumption in a Mobile Receiver", issued Feb. 21, 1995, assigned to the assignee of the present invention and incorporated by reference herein.

Thus, within the slotted paging mode, a mobile station reduces power consumption by disconnecting power from selected internal components during a sleep period between consecutive slots. However, even during the sleep period, the mobile station must reliably track the amount of elapsed time to determine when the next slot occurs to permit receive components of the mobile station to power up in time to receive any paging signals transmitted to the mobile station within the slot. One solution to this problem is to operate a high frequency clock throughout the sleep period and to track the amount of elapsed time using the high frequency clock. This solution allows the sleep period to be very precisely tracked. However, considerable power is consumed operating the high frequency clock and optimal power savings therefore are not achieved during the sleep period.

Hence, it would be desirable to instead employ a low frequency, low power clock during the sleep period to reduce power consumption. However, clock signals provided by low frequency, low power clocks typically suffer from considerable frequency drift such that the amount of elapsed time during the sleep period cannot be precisely determined by counting cycles of the low power, low frequency clock. Frequency drift within a mobile station can be particularly significant if there are temperature variations within the mobile station caused by, for example, heat generated by the operation of components of the mobile station or by changes in ambient conditions. For example, during an extended telephone call, internal components of the mobile station may heat to 87 degrees Celsius. During an extended period of inactivity between telephone calls, the internal components may cool to an ambient temperature of, perhaps, 25 degrees Celsius. Moreover, if the user places the mobile telephone in either a very hot or very cold location, corresponding temperature changes within the mobile station may occur. Typical low power, low frequency clock signal generators are affected significantly by even slight changes in temperature and are even more strongly affected by the wide variations in temperature that can occur in a mobile telephone. Indeed, the amount of frequency drift within a typical low power, low frequency clock signal used in a mobile station may be so great that, if used by itself to calculate elapsed time within the sleep period, there is a significant risk that the mobile station will not be reactivated in time to power up components to detect a paging signal transmitted within a next paging slot. Accordingly, important paging signals maybe missed, possibly resulting in missed phone calls and the like. Thus the timing accuracy provided by a low frequency, low power clock signal is typically poor.

Another significant problem with using low frequency clock signals to track elapsed time within a sleep period is the relative lack of precision provided by the low frequency clock. The lack of precision can result in a considerable off-set between the initiation of the sleep period and a first counted cycle of the low frequency clock signal and also a considerable off-set between a last counted cycle of the low frequency clock and the actual end of the sleep period. More specifically, a counter is typically employed to count either rising edges or falling edges of the low frequency clock signal to track elapsed time within the sleep period and, once the number of cycles of the low frequency clock corresponding to the length of the sleep period have been counted, the high frequency clock is then re-activated. However, nearly an entire cycle of the low frequency clock may elapse between the beginning at the sleep period and the first edge of the low-frequency clock signal detected by the counter. The initial off-set can have a duration anywhere from zero to one full cycle of the low frequency clock or, in some systems, possibly even more. With conventional systems, it is not possible to determine the duration of the initial off-set. The uncertainty in the duration of the initial offset further increases the amount of error in the determination of elapsed time within the sleep period resulting in an even greater risk that the next paging slot will be missed. In an exemplary system wherein the high frequency clock operates at 9.68 megahertz and the sleep clock operates at 32 kilohertz, there are about 300 cycles of the high frequency clock within each cycle of the sleep clock. Therefore, even if the system can reliably compensate for frequency drift, the high frequency clock may still need to be activated as many as 300 cycles of the high frequency clock earlier than necessary to thereby account for the unknown duration of the intial offset. Also, because the re-activation of the high frequency clock at the end of the sleep period is synchronized with transitions in the low frequency clock, the degree of precision by which the high frequency clock can be re-activated is limited by the precision of the low frequency clock. For example, even if the system reliably and precisely determines that the correct duration of the sleep period is 853.44 cycles of the sleep clock, the system will need to re-activate the high frequency clock no later than the detected transition of the 853rd cycle and therefore will not properly account for the remaining fractional number of cycles, i.e. the remaining 0.44 cycles.

With about 300 cycles of the high frequency clock occurring within each cycle of the sleep clock, in the example the high frequency clock is therefore turned on an additional 130 cycles earlier than necessary. In another example, if the correct duration of the sleep period is 853.99 cycles of the sleep mode clock, the high frequency clock will be turned on nearly 300 cycles earlier than necessary.

Hence, when using a low-frequency clock signal to track time during a sleep period, the mobile station is usually configured to return to an active mode well in advance of a next expected paging slot to thereby overcome possible timing errors cause by frequency drift in the low frequency clock and to compensate for the relative lack of precision in the low frequency clock. For example, if paging slots occur every 26.67 milliseconds, the mobile station may be programmed to activate the high frequency clock after only, for example, 25 milliseconds of sleep to ensure that the next paging slot is not missed. Hence, optimal power savings are not achieved.

One technique that has been proposed for compensating for timing errors inherent in low frequency, low power clock signal generators is to adapt a length of each sleep period based upon a timing accuracy of a previous sleep period. More specifically, if the mobile telephone wakes up too late within one sleep period to detect paging signals, the mobile station is adjusted to wake up earlier in the next sleep period. To determine whether a sleep period is too long or too short, the mobile station attempts to detect a unique word within a received paging signal, such as a message preamble which signifies the beginning of an assigned slot. If the unique word is not detected, the mobile station concludes that it woke up too late and therefore the sleep duration is decreased for the next sleep period. If the unique word was properly received, the mobile station either woke up on time or too early and the sleep duration is increased slightly for the next sleep period. One problem with the aforementioned technique is that it assumes that any failure to detect the unique word is the result of a timing error. However, there may be other reasons besides the duration of the sleep period that the unique word was not correctly received and demodulated, such as poor communication channel quality conditions. Moreover, even if failure to detect the unique word was the result of a timing error rather than other communication errors, the system still does not compensate for initial and final off-sets caused by the relative lack of precision in the low power, low frequency clock signal and therefore does not provide for optimal power savings.

A significant improvement is provided in U.S. patent application Ser. No. 09/134,808, entitled "Synchronization of a Low Power Oscillator with a Reference Oscillator in a Wireless Communication Device Utilizing Slotted Paging," filed Aug. 14, 1998 and assigned to the assignee of the present invention. In the aforementioned patent application, timing errors are corrected without relying upon the failure to receive portions of transmitted signals. Rather, the system includes a frequency error estimation unit for directly estimating frequency drift in the low power, low frequency clock. In one example described in the patent application, frequency drift in the low frequency clock is determined by timing the low frequency clock using a high frequency clock during periods of time when the high frequency clock is active. For example, during each paging slot when the high frequency clock of the mobile station is operating, the frequency error in the low frequency clock is calculated based upon the high frequency clock. The system operates to synchronize the activation of the high frequency clock very precisely to transitions in the low frequency clock signal.

Although the system of the aforementioned patent application provides a significant improvement over systems which rely on the detection of unique words within signals transmitted to the mobile station, considerable room for improvement remains. For example, the aforementioned initial and final offsets are not taken into account. Accordingly, even with the improved system of the patent application, the high frequency clock, signal must usually be activated somewhat in advance of the next expected paging slot to account for remaining timing errors. Hence, optimal power savings are not achieved. It would be preferable to provide a system wherein the active mode high frequency clock is turned on as close as possible to the next paging slot to permit maximum power savings during the sleep period and it is to that end that aspects of the invention are primarily directed. In particular, it is desirable to provide a system which compensates for the aforementioned initial and final offsets to re-activate the high frequency clock to be re-activated based upon fractional portions of the low frequency clock, and particular aspects of the invention are directed to those ends.

SUMMARY OF THE INVENTION

In accordance with the invention, a device is provided for use in activating an active-mode clock following a sleep period for use within a mobile station wherein selected components of the mobile station operate using a sleep-mode clock during the sleep period and a faster active-mode clock during non-sleep periods. The device includes a wake-up estimation unit for estimating a wake up time using the sleep-mode clock. A compensation unit is provided for compensating for timing off-set errors in the estimated wake up time caused by differences in precision between the sleep-mode clock and the active-mode clock. An active-mode clock activation unit activates the active-mode clock at the compensated wake-up time to terminate the sleep mode.

In an exemplary embodiment, the mobile station operates in a mobile communications system employing slotted paging. The device includes a frequency drift compensation unit for compensating for an error in the estimated wake up time caused by frequency drift in the sleep-mode clock. By compensating for both frequency drift and timing off-sets, the active-mode clock is activated at a wake-up time closely in synchronization with a next paging slot and significant power savings are achieved as compared with systems wherein the active-mode clock must be activated well in advance of the next paging slot to compensate for possible timing errors.

In the exemplary embodiment, compensation for timing offsets and frequency drift is achieved using a transition-mode clock which is employed at both the beginning and the end of each sleep period. The transition-mode clock has a frequency substantially greater than that of the sleep mode clock. The transition-mode clock permits the device to conveniently compensate for both frequency drift errors and timing offset errors to permit the active-mode clock to be re-activated later in the sleep period. The transition-mode clock is deactivated shortly after the sleep period begins and is reactivated only slightly before the sleep period is due to end and hence very little power is consumed by the transition-mode clock. Moreover, because the transition-mode clock permits the components of the mobile station to be reactivated later within the sleep period, any increase in power required to operate the transition-mode clock is more than compensated for by power servings achieved by permitting a longer sleep period.

Method and apparatus embodiments of the invention are described.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENTS

Referring to the figures, exemplary embodiments of the invention will now be described. The exemplary embodiments are first described with reference to the block diagrams of FIGS. 1 and 2 in combination with the timing diagram of FIG. 3. The operation of the invention is then summarized with reference to the flow chart of FIG. 4. Finally, a specific implementation of the invention is described with reference to FIG. 5.

Figure 1:
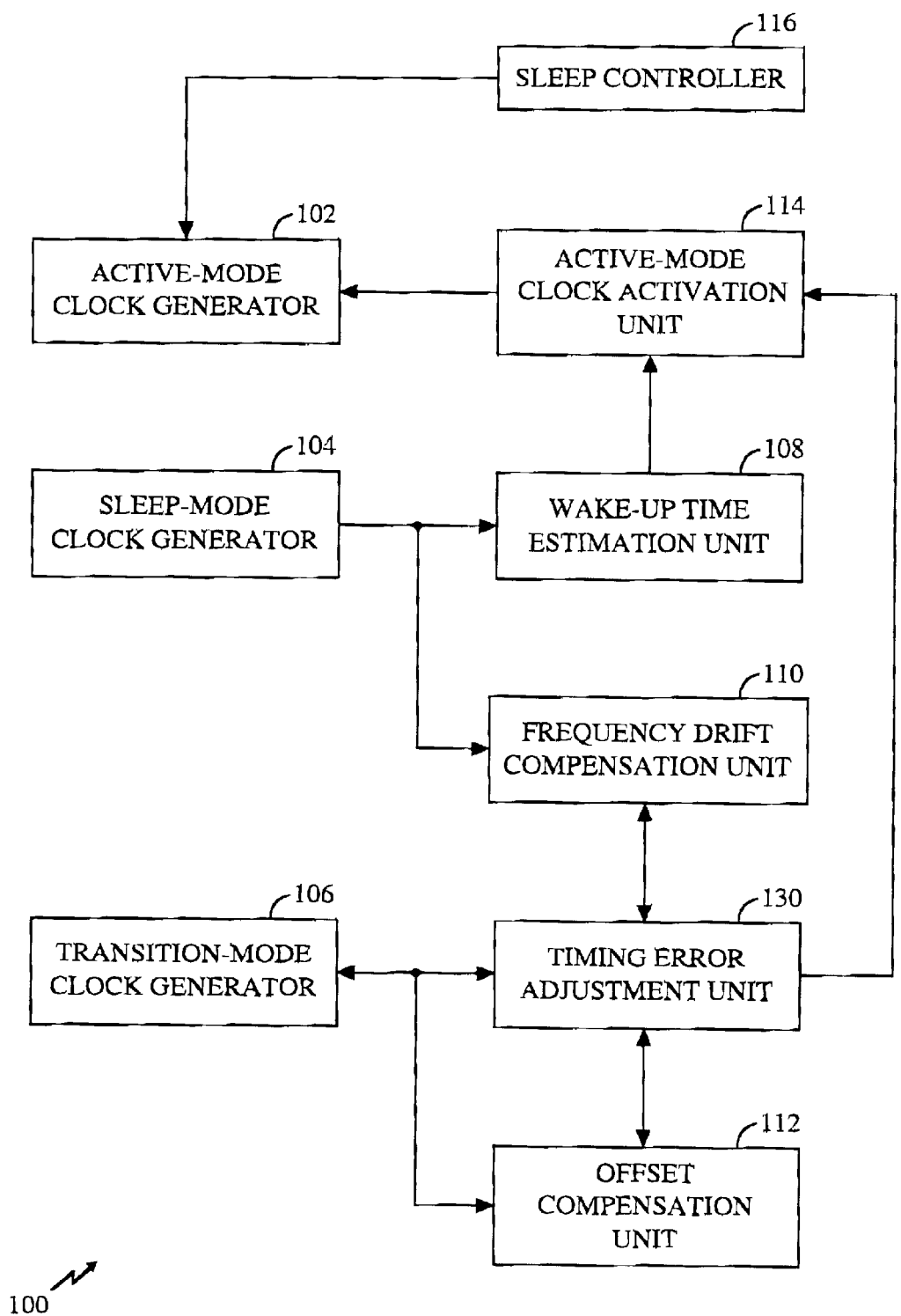
FIG. 1 is a block diagram illustrating a device, configured in accordance with exemplary embodiment of the invention, for activating an active-mode clock following a sleep period for use within a mobile station of a mobile communication system employing slotted paging.
Figure 3:
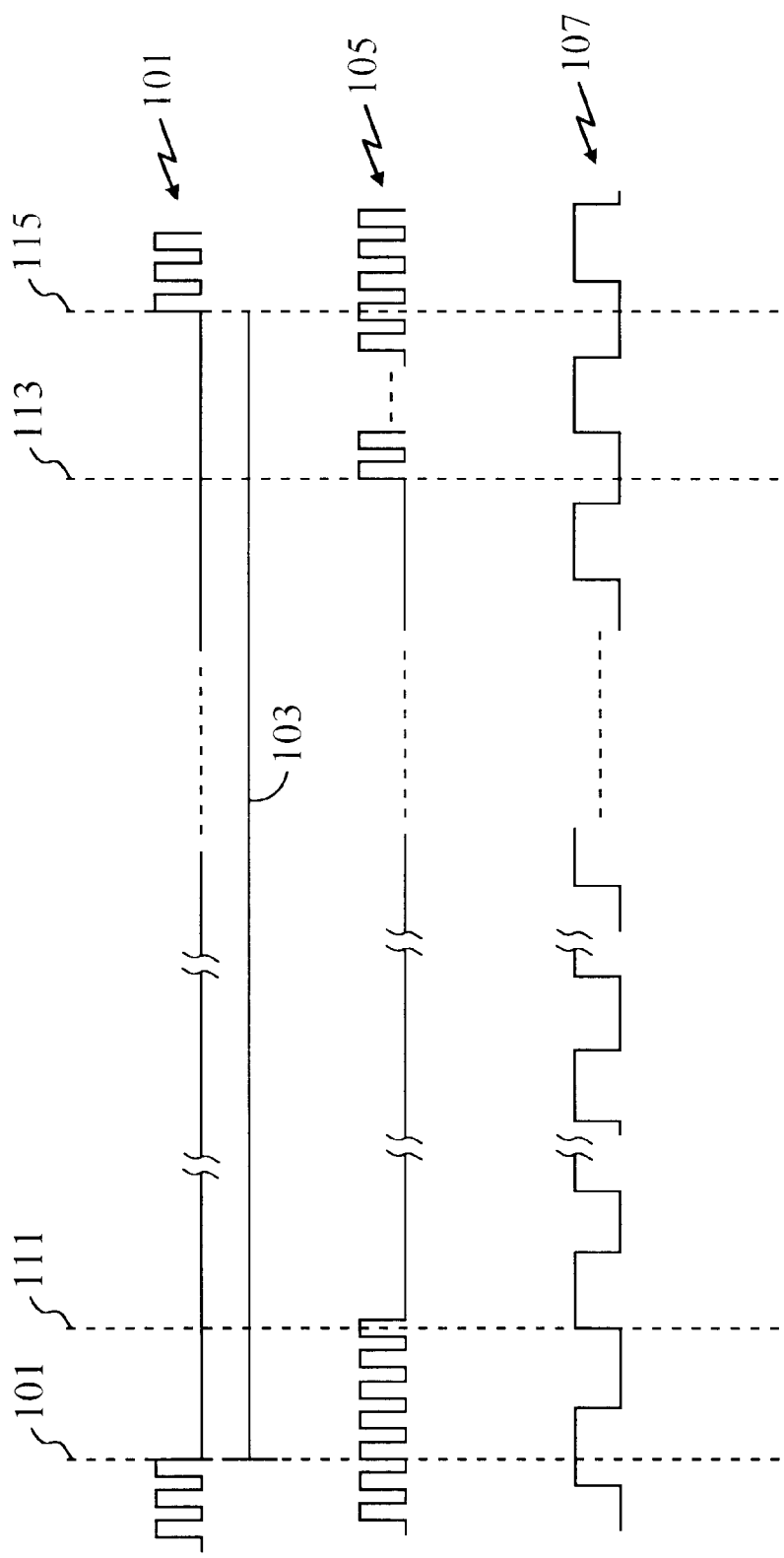
FIG. 3 is a timing diagram illustrating selected clock signals controlled by the device of FIGS. 1 and 2.
Figure 4:
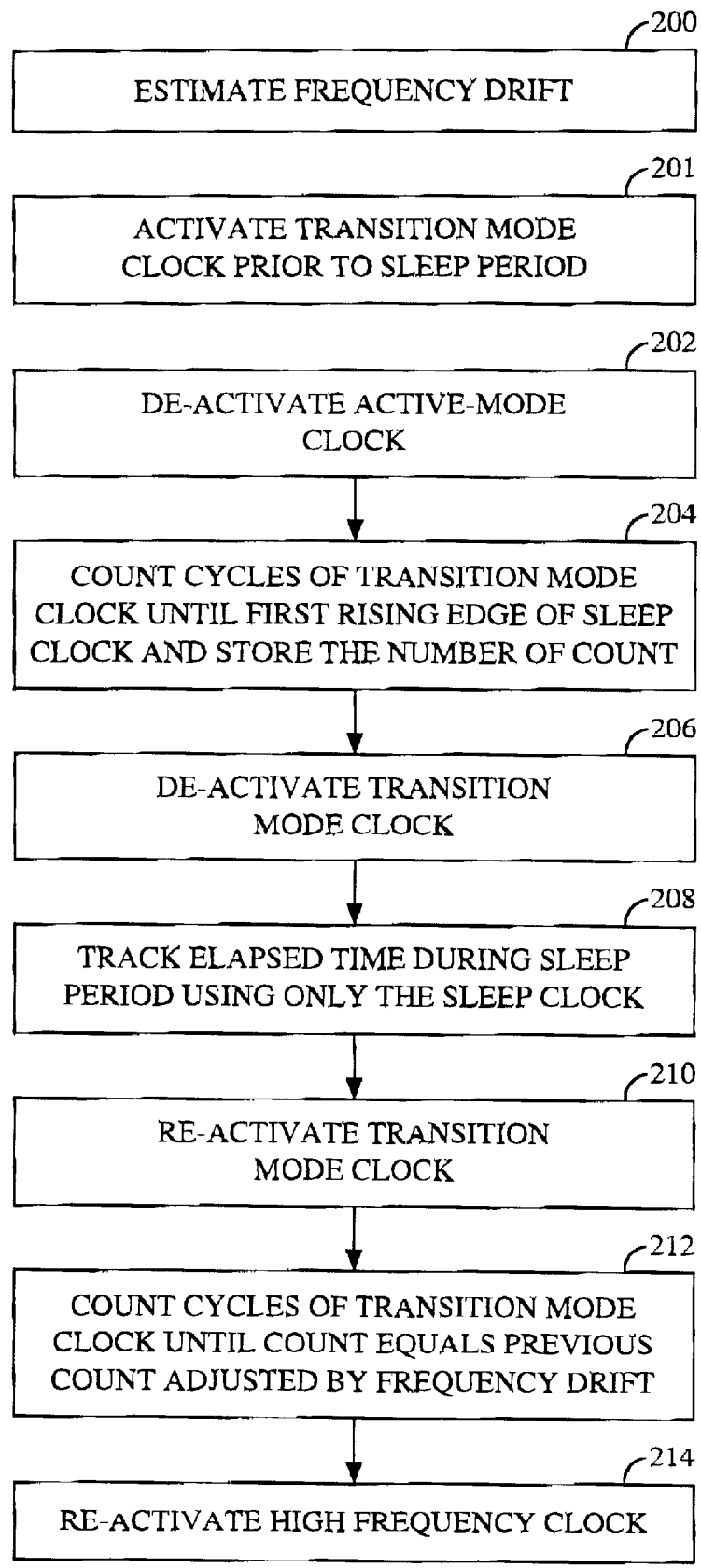
FIG. 4 is a flow chart illustrating a sequence of steps performed by the device of FIGS. 1 and 2 for activating the active-mode clock signal following a sleep period.

FIG. 1 illustrates an active-mode clock activation device 100 configured for activating a high frequency clock following a sleep period within a mobile station (not shown) operating within a mobile communications system employing slotted paging, such as a CDMA wireless telecommunications system. The high frequency clock is shown in FIG. 3 and is identified by reference numeral 101. The sleep period during which time the high frequency clock is deactivated is identified by reference numeral 103. The clock activation device is configured to activate the high frequency clock as close as possible to a next paging slot to maximize power savings during the sleep period while still enabling the mobile station to wake up in time to receive and respond to any paging signals transmitted to the mobile station within the slot. To this end, clock activation device 100 of FIG. 1 includes components for compensating for frequency drift within a low power, low frequency clock employed during the sleep period and components for compensating for initial and final timing offsets clock to thereby permit the high frequency clock to be turned on with a high degree of precision despite the fact that the sleep period is timed using only the low frequency clock. In the following, the high frequency clock employed by the mobile station during non-sleep modes is referred to as the active-mode clock and the low frequency clock signal employed for timing the sleep period is referred to as a sleep-mode clock. The sleep-mode clock remains active at all times during both sleep periods and non-sleep periods. Compensation for frequency drift and for timing offset is performed, in part, using a third clock having a frequency preferably equal to that of the active-mode clock. The third clock signal is referred to herein as a transition-mode clock and is employed at the beginning and end of each sleep period. In FIG. 3, the transition-mode clock signal is identified by reference numeral 105 and the sleep-mode clock is identified by reference numeral 107. As can be seen, the transition-mode clock remains active for at least a few cycles following deactivation of the active-mode clock and the transition-mode clock is reactivated at lease a few clock cycles prior to reactivation of the active-mode clock. In the following example, the active-mode clock and the transition-mode clock both operate at about 9.68 megahertz (mhz) and the sleep-mode clock operates at about 32 kilohertz (khz). However, different clock frequencies may be employed in different implementations. In FIG. 1, the active-mode, sleep-mode and transition-mode clock signals are generated by an active mode clock generator 102, a sleep-mode generator clock generator 104, and a transition-mode clock generator 106, respectively.

Clock activation device 100 of FIG. 1 includes a wake up time estimation unit 108 for estimating the end of a sleep period based solely upon clock cycles counted using the sleep-mode clock, i.e. the number of cycles of clock 107 of FIG. 3 counted during sleep period 103. A frequency drift compensation unit 110 calculates an adjustment factor for compensating for frequency drift within the sleep-mode clock and applies the adjustment faster using transition-mode clock signal 105 of FIG. 3. An offset time compensation unit 112 provides an additional adjustment factor for adjusting the wake up time to compensate for an offset between the beginning of the sleep period and a first counted clock cycle of the sleep-mode clock based upon clock cycles counted using the transition-mode clock signal, i.e. the offset time compensation unit compensates for the offset occurring between the beginning of the sleep period 103 at FIG. 3 which commences at time 109 and a first rising edge of sleep-mode clock 107 counted at time 111. The wake up time estimate provided by unit 108 of FIG. 1 and the adjustment factors provided by units 110 and 112 are both forwarded to an active-mode clock activation unit 114 which controls active-mode clock generator 102 to beginning outputting the active-mode clock signal for use by other components of the mobile station such as a CDMA receive unit used to receive paging signals within the paging slots transmitted from the base station. The active-mode clock activation unit may be, depending upon the particular implementation, controlled to activate the active-mode clock sufficiently in advance of the next paging slot to permit warmup of components of the mobile station such as the CDMA receive circuitry.

Thus, clock activation device 100 at FIG. 1 activates the active-mode clock following a sleep period based primarily upon the relatively imprecise sleep-mode clock but adjusted based upon frequency drift and timing offset adjustment factors using the much faster transition mode clock which is deactivated during most of the sleep period. In this manner, considerable power savings may be achieved over previous systems.

Figure 2:
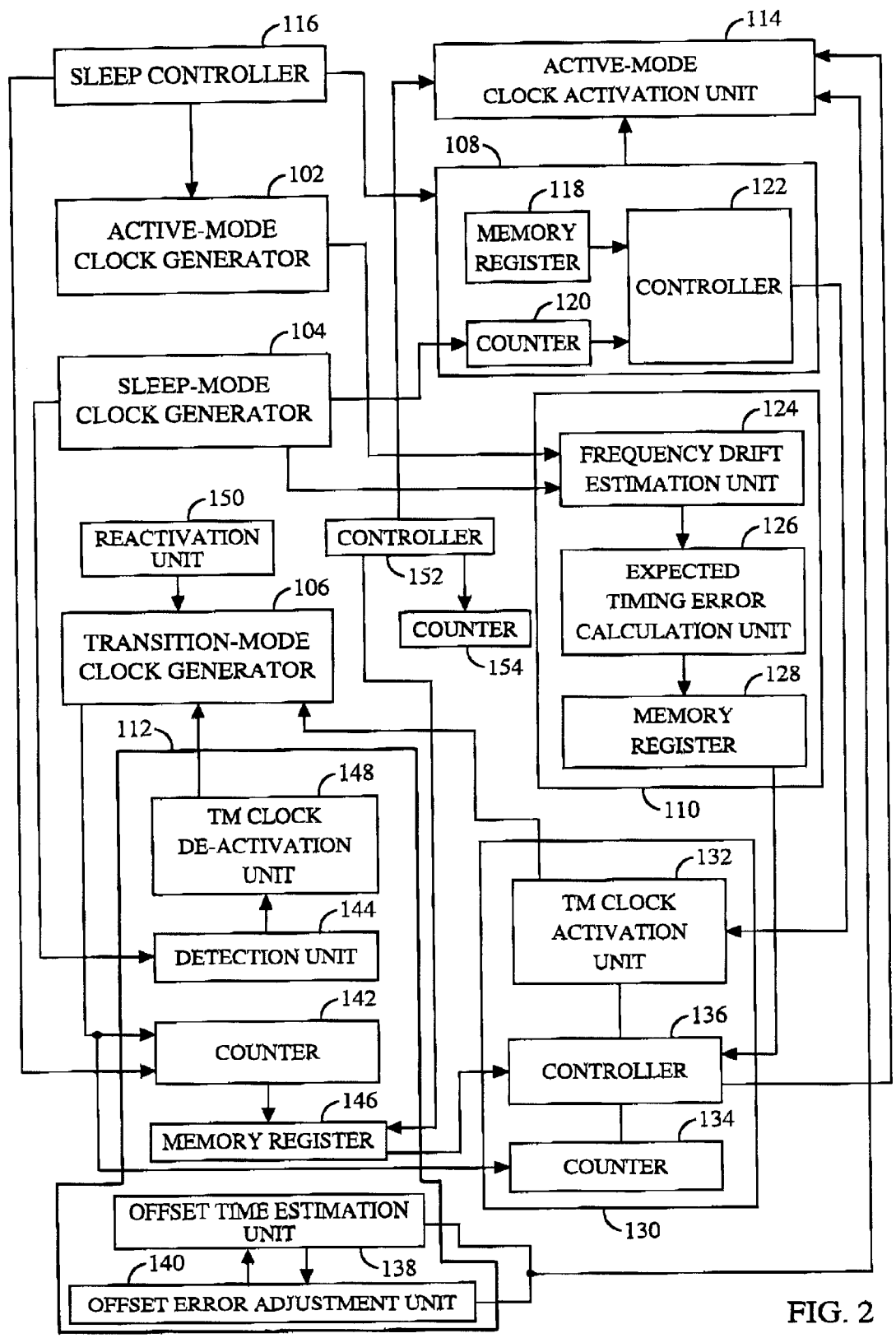
FIG. 2 is a block diagram illustrating the device of FIG. 1 in greater detail.

FIG. 2 provides details regarding the components of the wake up time estimation unit, the frequency drift compensation unit and the offset time compensation unit of FIG. 1. An exemplary sleep period of 26.67 milliseconds will be used in the description, although other sleep period durations may be employed. A sleep controller 116 initiates the sleep period by deactivating active-mode clock generator 102 and by controlling estimation unit 108 and compensation units 110 and 112 to begin operation. Wake up time estimation unit 108 provides an estimate of the end of the sleep period by counting the number of clock cycles within the sleep-mode clock (107 of FIG.2) and comparing the count to the expected number of clock signals expected within the sleep period assuming that the sleep-mode clock is not subject to any frequency drift and assuming that a first rising edge of the sleep-mode clock is synchronized with the start time of the sleep period. To this end, estimation unit 108 includes a memory register 118 storing the expected number of clock cycles of the sleep period minus any necessary warmup period and minus a maximum amount of time needed to adjust for offset errors and frequency drift errors. The warmup period is a predetermined value. The maximum amount of adjustment required to compensate for an initial offset at the beginning of the sleep period is one and a half (1_) cycles the sleep mode clock. The maximum amount of time necessary to adjust for frequency drift errors is a predetermined value calculated based upon maximum expected drift amounts based upon maximim expected temperature and power variations. These values may be calculated, without undue experimentation, based for example upon tests using sample components subject to expected temperature variations. For the example wherein the active-mode clock operates at 9.83 mhz and the sleep-mode clock operates at 30 khz, the memory register stores the number 300 minus the warmup period and minus the maximum expected drift and offset values. Thus, the memory register stores a number of clock cycles of the sleep-mode clock for a time period less than the actual expected sleep-mode period by an amount sufficient to permit a warmup period and to permit the transition-mode clock to be used to more precisely compensate for time variations.

A counter 120 is triggered by sleep mode controller 116 to begin counting rising edges of the sleep-mode clock signal. A controller 122 receives the count and compares the count with the expected number of clock cycles stored within memory register 118 and outputs an indicator signal when the clock equals the value in the memory register to indicate estimated completion of the sleep period. The indicator signal is transmitted to active-mode clock activation unit 114 for permitting reactivation of the active-mode clock subject to the adjustment factors provided by frequency drift compensation unit 110 and offset unit 112. Because the indicator signal is generated based upon the number of cycles in the memory which take into account any warmup period and any maximum expected adjustment period, the indicator signal therefore does not identify the actual expected end of the sleep period. Rather, the indicator signal is transmitted sufficiently in advance of the end of the expected sleep period to permit warmup and to permit the actual end of the sleep period to be precisely set using the adjustment factors provided by the frequency drift estimation unit and the offset estimation unit.

Frequency drift unit 110 includes a frequency drift estimation unit 124 for estimating an amount of drift in, for example, parts per million within the sleep-mode clock as a result of temperature variations and the like. In one example, the frequency drift estimation unit operates only while the active-mode clock generator is operating. The frequency drift estimation unit receives both the sleep-mode clock signal and the active-mode clock signal and counts the number of active-mode clock cycles within each cycle of the sleep-mode clock to maintain a running average of the actual frequency of the sleep-mode clock. To this end, a moving average window (MAW) filter may be employed. The frequency drift estimation unit compares an expected number of active-mode clock cycles found within each sleep-mode cycle with the actual number counted and calculates a frequency drift factor accordingly. In the example wherein the active-mode clock operates at 9.83 mhz and the sleep-mode clock operates at 30 khz, the frequency drift estimation unit is configured to expect about 300 cycles of the active-mode clock within each cycle of the sleep-mode clock.

In a preferred implementation, however, the frequency drift estimation unit is configured as described in a U.S. Patent Application entitled "Method and Apparatus for Compensating for Frequency Drift in a Low Frequency Clock Within a Mobile Station Operating in a Slotted Paging Mode", filed contemporaneously herewith and assigned to the assignee of the present invention. This application is incorporated by reference herein.

The estimated frequency drift value generated by estimation unit 124 is output to an expected timing error calculation unit 126 which calculates a timing error in milliseconds expected to occur between the wake up time generated by wake up estimation unit 108 and the next paging slot. For example, if the output of the frequency drift estimation unit is a expressed in parts per million, then the expected timing error calculation unit converts the parts per million value to an actual time value based upon the known length of the sleep period. The expected timing error is transmitted to a timing error adjustment unit 128 which controls active-mode clock activation unit 114 to delay activation of the active-mode clock by an amount sufficient to compensate for the estimated timing error has elapsed. To this end, the timing error adjustment unit includes a transition mode clock activation unit 132 for activating the transition mode clock generator 106 upon receipt of the indicator signal provided by the wake up estimation unit 108. A counter 134 then begins counting a number of clock cycles within the transition mode clock, i.e. the counter counts cycles of transition-mode clock 105 commencing at time 113 as shown in FIG. 3. A controller 136 calculates the number of transition mode clock cycles within the expected timing error, then outputs a control signal to the active-mode clock activation unit when the count maintained by counter 134 is equal to the calculated number of transition mode clock cycles, i.e. the control signal is output at time 115 as shown in FIG. 3. Active-mode clock activation unit 114 is configured to active the active-mode clock only where an enabling control signal is received from the frequency drift compensation unit and the off-set time compensation unit. Hence, the active mode clock is delayed at least until the control signal output by controller 136 of the frequency drift compensation unit is received.

Offset compensation unit 112 includes an initial offset time estimation unit 138 and an offset error adjustment unit 140 which together operate to calculate an offset between the beginning of the sleep period and the first rising edge of the sleep-mode clock and to output a control signal to the active-mode clock activation unit to adjust the active mode clock activation accordingly. In the example of FIG. 3, the transition-mode clock is activated sometime prior to the initiation of the sleep period and is therefore operational at the beginning of the sleep period. A counter 142, activated by sleep controller 116, begins counting cycles of the transition mode clock at the beginning of the sleep period. Counter 142 continues to count cycles until a first rising edge of the sleep-mode clock is detected by a detection unit 144, i.e. the counter 142 counts cycles of transition-mode clock 105 occurring between time 109 and time 111 as shown in FIG. 3. The number of counts is stored within a memory register 146 and the transition mode clock is then deactivated by a transition clock deactivation unit 148. The transition-mode clock remains inactive throughout the remaining portions of the sleep period until reactivated by a reactivation unit 150. The reactivation unit activates the transition mode clock upon receiving the indicator signal from wake up estimation unit 108. At that time, a controller 152 reads the value stored within memory register 146 and activates a counter 154 for counting the number of counts that had been stored in register 146. Upon expiration of counter 154, a control signal is sent from controller unit 152 to active-mode clock activation unit 114 to enable activation of the active-mode clock.

Thus, wake up time estimation unit 108 generates an indicator signal at a predetermined amount of time prior to the end of the sleep period as estimated using only the sleep-mode clock generator. The frequency drift compensation unit and the offset compensation unit delay activation of the active-mode clock from the receipt of the indicator signal to account for the duration of the warmup period and to compensation for frequency drift within the sleep-mode clock and to compensate for any offset between the beginning of the sleep period and a first counted cycle of the sleep-mode clock. In this manner, the active mode clock is synchronized to resume operation at the beginning of the warmup period giving it just sufficient enough time to allow components of the mobile station to warm up prior to the next paging slot. In this manner, power savings are achieved over devices which either do not compensate for frequency drift or do not compensate for the initial offset period.

Thus, FIGS. 1–3 collectively illustrate an exemplary embodiment of the invention operative to reactivate a high frequency clock signal at the end of a sleep period while compensating for both frequency drift and initial timing offsets, in part, using a transition-mode clock signal at the beginning and ends of the sleep periods. The method employing the transition-mode clock signal will now be briefly summarized with reference to the flow chart of FIG. 4. Initially, at step 200, the mobile station activates the transition-mode clock prior to the of a sleep period. At step 202, the high frequency active-mode clock is deactivated thereby initiating the sleep period. During step 204, the device counts a number of rising edges in the transition-mode signal occurring from the point and time the active-mode clock is terminated until a next rising edge of the sleep-mode clock, which remains active at all times. The number of counts determined during step 204 is stored in a counter. At step 204, the transition-mode clock is deactivated. During step 208, an estimate of the amount of elapsed time during the sleep period is calculated using only the low frequency sleep-mode clock. At step 210, the transition-mode clock signal is reactivated. The reactivation time is based upon the estimated end of the sleep period as determined using the sleep-mode clock minus a predetermined amount of time sufficient to allow for compensation of maximum expected frequency drift and timing off-set errors. During step 212 the number of cycles occurring in the transition-mode clock signal is counted until the count equals the number of counts recorded following step 204 plus the number of counts necessary to compensate for the calculated frequency drift. Once the appropriate number of cycles of the transition-mode clock have elapsed, then at step 214, the high frequency active-mode clock is reactivated, permitting components of the mobile station to warm up in time to receive a paging signal transmitting in the next paging slot.

In the following, an implementation of the invention configured for use with CDMA systems conforming to the IS-95A standard promogated by the Telecommunications Industry Association (TIA) is briefly described. According to the IS-95A standard, a CDMA "subscriber station" operating in the slotted mode maximizes the standby time by going to sleep, based on a parameter, Slot Cycle Index (SCI). The subscriber station wakes up every (1.28*2SCI) seconds to monitor an assigned 80 ms slot to receive pages. For example with SCI=0, the subscriber station ideally remains awake for 80 ms and sleeps for 1.2 sec. In practice, it needs to wake up a sufficient amount of time ahead of the next slot boundary to take care of events such as RF warm-up, synthesizer stabilization, clock settling, CDMA pilot search and acquisition, finger reassignment and decoder warm-up.

In each sleep cycle, the unit sleeps in "catnaps" to allow a good response time if the user presses a key while the subscriber station is asleep. The sleep cycle length and catnap length are chosen to be multiples of a psuedo-number (PN) roll (e.g. 26.67 ms) so that upon wake-up, a search may be made at the station find the pilot at approximately the same position. Each catnap is further divided into: (1) "sleep time," when the entire unit is put to sleep and (2) "warm-up time," when the RF and analog units are turned on for warm-up. When the subscriber station is asleep, the system time is approximately maintained by clocking the counters that keep track of sleep duration with a combination of a Slow Clock (SC) for coarse timing (maximum resolution of 1/60 k=16.7 sec) and a SLPCHIPX8 clock for fine timing (resolution of 1/(8*1.2288e6)=0.102 sec).

Figure 5:
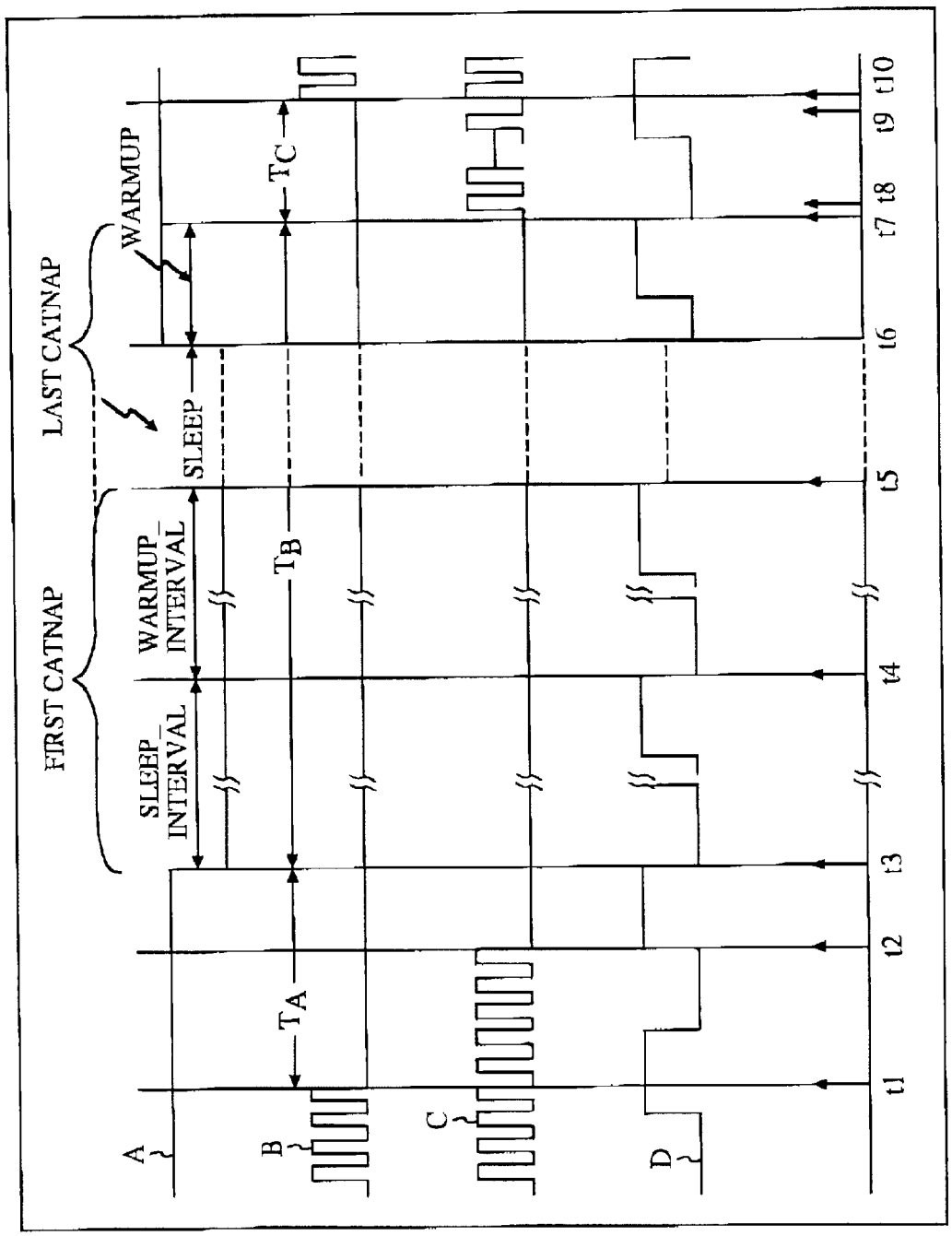
FIG. 5 is a timing diagram of a specific implementtion of the device of FIGS. 1 and 2 configured for use with CDMA.

An example of the events that constitute a sleep cycle is shown in FIG. 5. Waveform E marks each event in the sleep cycle as described below:

Before t1: When it is time to sleep, software of the subscriber station shuts off all unnecessary clock regimes except for a CDMA demodulator and decoder clock regime, RXCHIPX8 (Waveform B), which is based on the active-mode clock CHIPX8.

A multiple of 26.67 ms is split into sleep time and warm-up time and programmed as the duration of a first catnap interval through SLEEP_INTERVAL and WU_TIME registers.

Software running on a microprocessor of the subscriber station writes an ASIC_SLEEP_ARM bit of a SLEEP_CTL register, indicating that the subscriber station can go to sleep on the next PN roll (indicated by t1).

All along, the sleep clock (SC) (Waveform D) is run asynchronous to the CDMA clock regime CHIPX8, while the SLPCHIPX8 (Waveform C), i.e. the transition-mode clock is in sync with the RXCHIPX8, having been derived from the same source, CHIPX8.

At time t1 when the next PN roll occurs, the RXCHIPX8 clock regime is disabled putting the subscriber station to sleep. From this point onwards, the sleep period should be very close to multiples of 26.67 ms as determined using counters SLEEP_INTERVAL and WU_TIME running off the SC. To account for the asynchronous SC, a counter called CHIPX8_SLEEP_TIME starts counting the SLPCHIPX8's that have elapsed from t1 to the next rising edge of the SC.

At time t2, the rising edge of SC occurs at which time the SLPCHIPX8clock regime is disabled, freezing the CHIPX8_SLEEP_TIME, thereby providing an estimate of the time duration (t2–t1) in chipx8 units.

At time t3, after half an SC duration, a SLEEP_N signal (Waveform A) goes low on the falling edge of the SC. This puts the other digital, analog and RF components in the subscriber station in a low power mode. If there are NSC chipx8's in a SC, the total time elapsed at this point of time is given by: $T_A=(t2-t1)+(t3-t2)=\{CHIPX8\_SLEEP\_TIME+\_NSC\}$ chipx8s. It may be noted that from this definition, $T_A$ will be in the range of __-1__slow clock cycles. Subsequent catnaps should be adjusted to account for this extra time slept owing to the asynchronous sleep crystal. Also the counter SLEEP_INTERVAL running off the SC starts to counts down.

At time t4, the counter SLEEP_INTERVAL asserts the wake-up interrupt when it reaches a zero count. The microprocessor of the subscriber station wakes up and determines if hardware needs to be awake at the next slot or to service a key-press event.

If neither of these conditions is met, the software ensures that the hardware can remain asleep by keeping the SLEEP_N signal active during the warm-up count down (via the WU_TIME counter). At this time, the software estimates the number of SC's needed to sleep in the next catnap based on several factors such as next catnap length, asynchronous lag in the slow clock, drift and truncation errors that arise from the use of SC to approximate a multiple of PN roll.

At time t5, when the WU_TIME counter expires, a new value obtained in the previous step is loaded into the SLEEP_INTERVAL counter. The WU_TIME counter is a precomputed constant specified by the RF hardware warm-up requirements. The microprocessor goes back to sleep awaiting the wake-up interrupt from the next catnap.

At time t6, if however there are any pending interrupts to be serviced or if this is the last catnap allowed in this sleep cycle, the hardware is woken up to be ready for the next slot by causing the SLEEP_N signal to go inactive at the wake-up interrupt. While the WU_TIME counter counts down, the analog and RF components warm up.

At time t7, the WU_TIME counter expires indicating the end of the last catnap and the SLPCHIPX8 regime is turned on at time t8. As a side note, the total time elapsed during all the catnaps, denoted by $T_B=t7-t3$, will be close to integer multiple of SC's. Due to the several factors mentioned previously that go into the sleep calibration, there will usually be a residual amount of time (a fraction of SC) for which the subscriber station needs to still remain asleep. This fractional SC (denoted by $T_C$) is converted into chipx8 units and programmed into the CHIPX8_SLEEP_TIME that starts counting down clocked by the SLPCHIPX8.

At time t9, the CHIPX8_SLEEP_TIME expires, and the hardware turns on the RXCHIPX8 at time t10. The last time duration of interest is $T_C=t9-t7$.

The exemplary embodiments have been primarily described with reference to schematic diagrams illustrating pertinent features of the embodiments. It should be appreciated that not all components of a complete implementation of a practical system are necessarily illustrated or described in detail. Rather, only those components necessary for a thorough understanding of the invention have been illustrated and described. Actual implementations may contain more components or, depending upon the implementation, fewer components. The description of the exemplary embodiments is provided to enable any person skilled in the art to make or use the present invention. Various modifications to these embodiments will be readily apparent to those skilled in the art and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A device for activating an active-mode clock following a sleep period for use within a mobile station wherein selected components of the mobile station operate using a sleep-mode clock during the sleep period and a faster active-mode clock during non-sleep periods said device comprising:

means for estimating a wake up time using the sleep-mode clock;

means for compensating for errors in the estimated wake up time caused by differences in precision between the sleep-mode clock and the active-mode clock; and means for activating the active-mode clock at the compensated wakeup time, wherein the means for compensating for errors in the estimated wake up time caused by differences in precision between the sleep-mode clock and the active-mode clock includes:

means for determining the duration of an initial off-set occurring between a beginning of the sleep period and a first counted cycle of the sleep-mode clock and for adjusting the estimated wake-up time based on the duration of the initial off-set; and means for determining the duration of a final off-set occurring between a final counted cycle of the sleep-mode clock and an end of the sleep period and for adjusting the estimated wake-up time based on the duration of the final off-set.

2. The device of claim 1 further including means for compensating for an error in the estimated wake up time caused by frequency drift in the sleep-mode clock.

3. The device of claim 1 wherein said means for compensating for an error in the estimated wake up time caused by frequency drift in the sleep-mode clock comprises:

means for estimating the frequency drift occurring in the sleep-mode clock occurring during a single sleep period; and means for calculating an expected timing error between an actual sleep period duration and a duration of a sleep period as counted by a sleep-mode clock subject to the estimated frequency drift;

timing error adjustment means for controlling the means for activating the active-mode clock to adjust the activation time based the expected timing error.

4. The device of claim 3 wherein the timing error adjustment means comprises:

means for activating an transition-mode clock signal at a start time prior to the estimated wake-up time, said transition-mode clock having a frequency substantially greater than that of the sleep-mode clock;

means for calculating a number of clock cycles of the transition-mode clock signal occurring between the transition-mode clock start time and the expected end of the sleep period;

means for calculating a number of clock cycles of the transition-mode clock signal occurring within the expected timing error;

means for adding the number of clock cycles occurring between the transition-mode clock start time and the expected end of the sleep period and the number of clock cycles occurring within the expected timing error to yield a combined number of clock cycles;

means for counting an elapsed number of cycles in the transition-mode clock; and means for controlling the means for activating the active-mode clock to delay activation of the active-mode clock following the transition-mode clock start time until the combined number of clock cycles of the transition-mode clock have elapsed.

5. The device of claim 1 wherein said means for determining the duration of an initial off-set occurring between a beginning of the sleep period and a first counted cycle of the sleep-mode clock and for adjusting the estimated wake-up time based on the duration of the initial off-set comprises:

means for generating an transition-mode clock signal having a frequency substantially greater than that of the sleep-mode clock;

means for counting an elapsed number of cycles in the transition-mode clock occurring between a start of the sleep period and a next rising edge of the sleep-mode clock;

means for storing the counted number of clock cycles;

means for de-activating the transition-mode clock;

means for re-activating the transition-mode clock signal at a start time prior to the estimated wake-up time; and delay means for controlling the means for activating the active-mode clock to delay activation of the active-mode clock until the counted number of clock cycles of the transition-mode clock have elapsed.

6. The device of claim 1 wherein the mobile station operates in a mobile communications system employing slotted paging and wherein the sleep period is substantially equal to a time period between consecutive paging slots such that the active-mode clock is activated at a wake up time substantially synchronized with a next paging slot.

7. A device for activating an active-mode clock following a sleep period for use within a mobile station wherein selected components of the mobile station operate using a sleep-mode clock during the sleep period and the faster active-mode clock during non-sleep periods, said device comprising:

a wake-up estimation unit for estimating a wake up time using the sleep-mode clock;

a compensation unit for compensating for errors in the estimated wake up time caused by differences in precision between the sleep-mode clock and the active-mode clock; and an active-mode clock activation unit for activating the active-mode clock at the compensated wake-up time, wherein the compensating unit includes:

an initial off-set compensation unit for determining the duration of an initial off-set occurring between a beginning of the sleep period and a first counted cycle of the sleep-mode clock and for adjusting the estimated wake-up time based on the duration of the initial off-set; and a final off-set compensation unit for determining the duration of a final off-set occurring between a final counted cycle of the sleep-mode clock and an end of the sleep period and for adjusting the estimated wake-up time based on the duration of the final off-set.

8. The device of claim 7 further including a frequency drift compensation unit for compensating for an error in the estimated wake up time caused by frequency drift in the sleep-mode clock.

9. The device of claim 7 wherein said wake-up estimation unit comprises a register for storing a predetermined number of clock cycles occurring within a single sleep period for a clock operating at a predetermined intended sleep-mode frequency;

a counter for counting an elapsed number of cycles in the sleep-mode clock during the sleep period; and an indicator unit for indicating when the counted number of clock cycles equals the expected number of clock cycles.

10. The device of claim 7 wherein said frequency error compensation unit comprises:

a frequency drift estimation unit for estimating the frequency drift occurring in the sleep-mode clock occurring during a single sleep period;

an expected timing error calculation unit for calculating an expected timing error between an actual sleep period duration and a duration of a sleep period as counted by a sleep-mode clock subject to the estimated frequency drift; and a timing error adjustment unit for controlling the active-mode clock activation unit to adjust the activation time based the expected timing error.

11. The device of claim 10 wherein the timing error adjustment unit comprises:

an transition-mode clock activation unit for activating an transition-mode clock signal at a start time prior to the estimated wake-up time, said transition-mode clock having a frequency substantially greater than that of the sleep-mode clock;

a first calculation unit for calculating a number of clock cycles of the transition-mode clock signal occurring between the transition-mode clock start time and the expected end of the sleep period;

a second calculation unit for calculating a number of clock cycles of the transition-mode clock signal occurring within the expected timing error;

an adder for adding the number of clock cycles occurring between the transition-mode clock start time and the expected end of the sleep period and the number of clock cycles occurring within the expected timing error to yield a combined number of clock cycles;

a counter for counting an elapsed number of cycles in the transition-mode clock; and a controller for controlling the active-mode clock activation unit to delay activation of the active-mode clock following the transition-mode clock start time until the combined number of clock cycles of the transition-mode clock have elapsed.

12. The device of claim 7 wherein said initial off-set compensation unit for determining the duration of an initial off-set occurring between a beginning of the sleep period and a first counted cycle of the sleep-mode clock and for adjusting the estimated wake-up time based on the duration of the initial off-set comprises:

a clock signal generator for generating an transition-mode clock signal having a frequency substantially greater than that of the sleep-mode clock;

a counter for counting an elapsed number of cycles in the transition-mode clock occurring between a start of the sleep period and a next rising edge of the sleep-mode clock;

a register for storing the counted number of clock cycles; and a de-activation unit for deactivating the transition-mode clock; and wherein said off-set error adjustment unit comprises a re-activation unit for re-activating the transition-mode clock signal at a start time prior to the estimated wake-up time; and a delay unit for controlling the active-mode clock activation unit to delay activation of the active-mode clock until the counted number of clock cycles of the transition-mode clock have elapsed.

13. The device of claim 7 wherein the mobile station operates in a mobile communications system employing slotted paging and wherein the sleep period is substantially equal to a time period between consecutive paging slots such that the active-mode clock is activated at a wake up time substantially synchronized with a next paging slot.

14. A method for activating an active-mode clock following a sleep period for use within a mobile station wherein selected components of the mobile station operate using a sleep-mode clock during the sleep period and the faster active-mode clock during non-sleep periods, said method comprising the steps of:

estimating a wake up time using the sleep-mode clock;

compensating for errors in the estimated wake up time caused by differences in precision between the sleep-mode clock and the active-mode clock; and activating the active-mode clock at the compensated wake-up time, wherein the step of compensating for errors in the estimated wake up time caused by differences in precision between the sleep-mode clock and the active-mode clock includes the steps of:

determining the duration of an initial off-set occurring between a beginning of the sleep period and a first counted cycle of the sleep-mode clock and for adjusting the estimated wake-up time based on the duration of the initial off-set; and determining the duration of a final off-set occurring between a final counted cycle of the sleep-mode clock and an end of the sleep period and for adjusting the estimated wake-up time based on the duration of the final off-set.

15. The method of claim 14 further including the step of compensating for an error in the estimated wake up time caused by frequency drift in the sleep-mode clock.

16. The method of claim 14 wherein said step of estimating the wake up time comprises the steps of:

storing a predetermined number of clock cycles occurring within a single sleep period for a clock operating at a predetermined intended sleep-mode frequency;

counting an elapsed number of cycles in the sleep-mode clock during the sleep period; and indicating when the counted number of clock cycles equals the expected number of clock cycles.

17. The method of claim 14 wherein said step of compensating for an error in the estimated wake up time caused by frequency drift in the sleep-mode clock comprises the steps of:

estimating the frequency drift occurring in the sleep-mode clock occurring during a single sleep period;

calculating an expected timing error between an actual sleep period duration and a duration of a sleep period as counted by a sleep-mode clock subject to the estimated frequency drift; and adjusting the activating time of the active-mode clock based the expected timing error.

18. The method of claim 14 wherein the step adjusting the activating time comprises the steps of:

activating an transition-mode clock signal at a start time prior to the estimated wake-up time, said transition-mode clock having a frequency substantially greater than that of the sleep-mode clock;

calculating a number of clock cycles of the transition-mode clock signal occurring between the transition-mode clock start time and the expected end of the sleep period;

calculating a number of clock cycles of the transition-mode clock signal occurring within the expected timing error;

adding the number of clock cycles occurring between the transition-mode clock start time and the expected end of the sleep period and the number of clock cycles occurring within the expected timing error to yield a combined number of clock cycles;

counting an elapsed number of cycles in the transition-mode clock; and delaying activation of the active-mode clock following the transition-mode clock start time until the combined number of clock cycles of the transition-mode clock have elapsed.

19. The method of claim 14 wherein said step of compensating for an error in the estimated wake up time caused by an initial off-set comprises:

generating an transition-mode clock signal having a frequency substantially greater than that of the sleep-mode clock;

counting an elapsed number of cycles in the transition-mode clock occurring between a start of the sleep period and a next rising edge of the sleep-mode clock;

storing the counted number of clock cycles; and de-activating the transition-mode clock; and wherein said step of activating the active-mode clock comprises the steps of re-activating the transition-mode clock signal at a start time prior to the estimated wake-up time; and delaying activation of the active-mode clock until the counted number of clock cycles of the transition-mode clock have elapsed.

20. The method of claim 14 wherein the mobile station operates in a mobile communications system employing slotted paging and wherein the sleep period is substantially equal to a time period between consecutive paging slots such that the active-mode clock is activated at a wake up time substantially synchronized with a next paging slot.

* * * * *